United States Patent
Higuchi et al.

(10) Patent No.: US 8,498,663 B2
(45) Date of Patent: *Jul. 30, 2013

(54) BASE STATION, MOBILE STATION, AND POWER CONTROL METHOD

(75) Inventors: Kenichi Higuchi, Saitama (JP); Hiroyuki Atarashi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/614,239

(22) Filed: Sep. 13, 2012

(65) Prior Publication Data

US 2013/0012256 A1 Jan. 10, 2013

Related U.S. Application Data

(63) Continuation of application No. 11/917,341, filed as application No. PCT/JP2006/311874 on Jun. 13, 2006, now Pat. No. 8,290,528.

(30) Foreign Application Priority Data

Jun. 14, 2005 (JP) .................................. 2005-174395
Aug. 23, 2005 (JP) .................................. 2005-241902

(51) Int. Cl.
*H04B 7/00* (2006.01)

(52) U.S. Cl.
USPC ............... 455/522; 455/68; 455/69; 455/135; 455/226.3

(58) Field of Classification Search
USPC ............... 455/522, 67.11, 68–70, 115.3, 126, 455/127.1, 127.2, 135, 226.3, 277.2, 296, 455/452.2, 161.3; 370/318, 332, 333
See application file for complete search history.

(56) References Cited

U.S. PATENT DOCUMENTS

| | | | |
|---|---|---|---|
| 5,960,353 A | 9/1999 | Lee | |
| 6,175,744 B1 | 1/2001 | Esmailzadeh et al. | |
| 6,731,620 B1 | 5/2004 | Lim et al. | |
| 6,870,901 B1 * | 3/2005 | Gudmundsson et al. | 379/22 |
| 7,096,034 B2 * | 8/2006 | Zhang et al. | 455/522 |
| 7,418,249 B2 * | 8/2008 | Matsumura | 455/226.4 |

(Continued)

FOREIGN PATENT DOCUMENTS

| | | |
|---|---|---|
| EP | 1351411 A1 | 10/2003 |
| JP | 10-215219 | 8/1998 |

(Continued)

OTHER PUBLICATIONS

International Search Report for PCT/JP2006/311874 mailed Sep. 19, 2006, 2 pages.

(Continued)

*Primary Examiner* — Dominic E Rego
(74) *Attorney, Agent, or Firm* — Osha + Liang LLP

(57) ABSTRACT

A base station includes: means that derives a transmission power of a mobile station based on receive quality of an uplink pilot channel; means that reports the derived transmission power to the mobile station; and means that receives a control channel transmitted by the mobile station according to the reported information. Accordingly, irrespective of transmission power history over a past continuous time, the mobile station receives an instruction on the transmission power from the base station each time when transmitting a packet so as to be able to adjust the transmission power.

15 Claims, 15 Drawing Sheets

U.S. PATENT DOCUMENTS

| | | |
|---|---|---|
| 7,515,927 B2 * | 4/2009 | Das et al. .................. 455/522 |
| 2002/0055367 A1 | 5/2002 | Hamabe et al. |
| 2002/0094782 A1 | 7/2002 | Lin |
| 2002/0111184 A1 | 8/2002 | Takano et al. |
| 2002/0160798 A1 | 10/2002 | Shoji et al. |
| 2002/0196766 A1 | 12/2002 | Hwang et al. |
| 2003/0045318 A1 * | 3/2003 | Subrahmanya ............. 455/522 |
| 2003/0064744 A1 * | 4/2003 | Zhang et al. ............... 455/522 |
| 2003/0083092 A1 * | 5/2003 | Kim et al. .................. 455/522 |
| 2003/0100329 A1 | 5/2003 | Kwon et al. |
| 2004/0157561 A1 | 8/2004 | Akerberg |
| 2005/0009551 A1 * | 1/2005 | Tsai et al. ................... 455/522 |
| 2005/0226182 A1 * | 10/2005 | Itoh ............................ 370/329 |
| 2005/0249127 A1 * | 11/2005 | Huo et al. .................. 370/252 |
| 2006/0262754 A1 * | 11/2006 | Andersson et al. ......... 370/332 |
| 2006/0286996 A1 * | 12/2006 | Julian et al. ................ 455/522 |
| 2007/0030838 A1 * | 2/2007 | Kaikkonen et al. ......... 370/342 |

FOREIGN PATENT DOCUMENTS

| | | |
|---|---|---|
| JP | 2001-238269 | 8/2001 |
| JP | 2003-318821 | 11/2003 |
| JP | 2005-510174 | 4/2005 |
| JP | 2005-123898 | 5/2005 |
| RU | 2237975 C1 | 10/2004 |

OTHER PUBLICATIONS

Written Opinion of International Searching Authority for PCT/JP2006/311874 mailed Sep. 19, 2006, 5 pages.

Keiji Tachikawa, "W-CDMA Mobile Communication Systems"; published by Maruzen K.K., pp. 126-128, Jun. 25, 2001 w/ partial English translation (8 pages).

Taiwanese Office Action for Application No. 095120992, mailed on Dec. 1, 2009 (13 pages).

Russian Office Action for Application No. 2008100085, mailed on Mar. 9, 2010 (10 pages).

English abstract for Russian Publication No. 2 237 975, publication date Oct. 10, 2004, (1 page).

Chinese Office Action for Application No. 200680024547.9, mailed on Mar. 16, 2011 (15 pages).

* cited by examiner

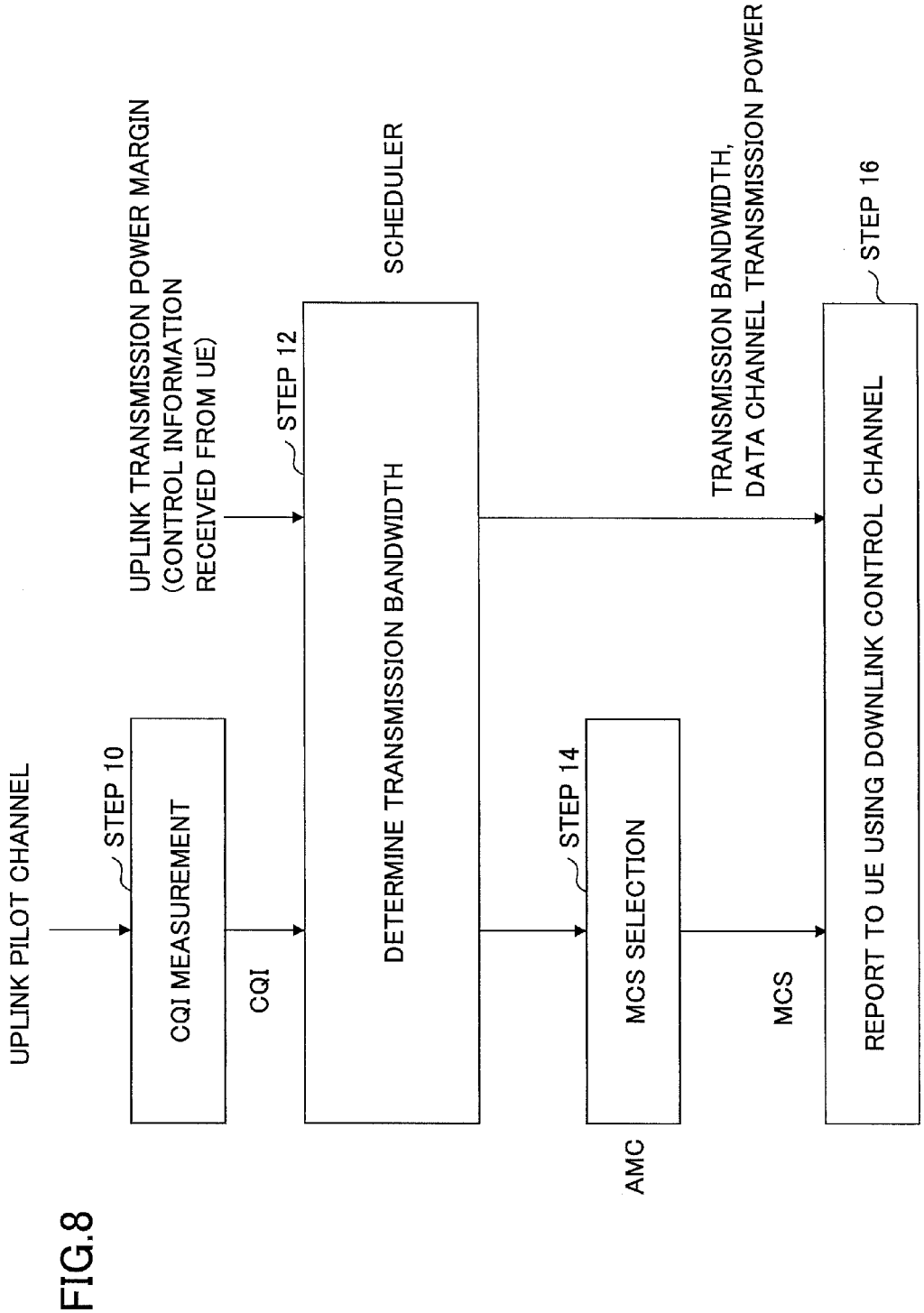

FIG.12

| REPORTED CQI | TRANSMISSION POWER OF DOWNLINK SHARED CONTROL CHANNEL |
|---|---|
| 1 ↑ BAD | $P_{TX1}$ ↑ HIGH |
| 2 | $P_{TX2}$ |
| 3 | $P_{TX3}$ |
| 4 | $P_{TX4}$ |
| 5 | $P_{TX5}$ |
| ⋮ ↓ GOOD | ⋮ ↓ LOW |

FIG.13

| CONTROL INFORMATION FOR DOWNLINK | CONTROL INFORMATION FOR UPLINK |
|---|---|
| DEMODULATION INFORMATION<br>CHUNK ASSIGNMENT INFORMATION<br>DATA MODULATION INFORMATION<br>TRANSPORT SIZE INFORMATION | TRANSMISSION POWER CONTROL BIT<br>TRANSMISSION TIMING CONTROL BIT<br>RESPONSE CONTENTS (ACK/NACK)<br>FOR CONTENTION-BASED CHANNEL |
| SCHEDULING INFORMATION<br>UE IDENTIFICATION INFORMATION<br>HARQ INFORMATION<br>HARQ PROCESS INFORMATION<br>REDUNDANCY FORMAT<br>NEW DATA INDICATOR | SCHEDULING INFORMATION<br>UE IDENTIFICATION INFORMATION<br>CHUNK ASSIGNMENT INFORMATION<br>DATA MODULATION INFORMATION<br>TRANSPORT BLOCK SIZE INFORMATION<br>HARQ |
| | ACK/NACK |

PHYSICAL LAYER { (rows 1-2)

L2 LAYER { (row 3)

FIG.14

|  | TRANSMISSION POWER | |
|---|---|---|
| USER#1 | $P_1$ | $P_\alpha$ |
| USER#2 | $P_2$ | |
| USER#3 | $P_3$ | |
| USER#4 | $P_{FIX}$ | |
| USER#5 | $P_{FIX}$ | |

BASE STATION, MOBILE STATION, AND POWER CONTROL METHOD

CROSS-REFERENCE TO RELATED APPLICATIONS

The present application is a continuation application of and, thereby, claims benefit under 35 U.S.C. §120 to U.S. application Ser. No. 11/917,341, entitled, "BASE STATION, MOBILE STATION, AND POWER CONTROL METHOD," which is a national stage application of PCT Application No. PCT/JP2006/311874, filed on Jun. 13, 2006, which claims priority to JP 2005-174395 filed Jun. 14, 2005 and JP 2005-241902 filed Aug. 23, 2005. The contents of the priority applications are incorporated by reference in their entirety.

TECHNICAL FIELD

The present invention generally relates to radio communication. More particularly, the present invention relates to a base station, a mobile station and a method for controlling transmission power of a shared control channel used for packet switching type communication.

BACKGROUND ART

In a mobile communication system such as IMT-2000, transmission power control is performed from the viewpoint of enlargement of circuit capacity and economy of battery of a mobile station and the like. For example, quality measurement of a channel is performed in a receiving side, and a transmission power control (TPC) bit is transmitted by a return channel (DPCCH, for example) such that the channel that is being received satisfies desired quality. As a result, the transmission power is updated by 1 dB, for example, and quality measurement and transmitting/receiving of the TPC bit are repeated, so that the transmission power can be gradually changed to be closer to an optimal value. That is, in a communication of a circuit switching scheme, an individual channel is assigned specifically to a mobile station, and the transmission power of the mobile station is gradually adjusted based on a temporally continuing history on the transmission power. Such transmission power control is described in a non-patent document 1, for example.
[Non Patent document 1] Keiji Tachikawa, "W-CDMA mobile communication scheme", MARUZEN, pp. 126-128

DISCLOSURE OF THE INVENTION

Problem to be Solved by the Invention

In a future mobile communication system, a packet switching type communication scheme is adopted in place of the conventional circuit switching type communication scheme. Radio resources of a packet form are shared by a plurality of users, and availability of the radio resources is properly scheduled in a base station. In such a mobile communication system, there is not only a mobile station to which the radio resources are actually assigned but also a mobile station that desires assignment but to which the resources are not yet assigned. In addition, such a situation arises in circuits of both of uplink and downlink. For causing a mobile station placed in various operation situations to operate properly, it is necessary that the shared control channel is transmitted well with a constant quality. Thus, it is necessary that the transmission power of the shared control channel is properly controlled. But, the above-mentioned transmission power control method of the circuit switching type cannot be used as it is, and a useful method is not yet established.

An object of the present invention is to provide a base station, a mobile station and a power control method for controlling transmission power of a shared control channel using a method suitable for packet switching type communication.

Means for Solving the Problem

In the present invention, a base station, is used, that includes: means that derives a transmission power of a mobile station based on receive quality of an uplink pilot channel; means that reports the derived transmission power to the mobile station; and means that receives a control channel transmitted by the mobile station according to the reported information.

Effect of the Invention

According to the present invention, transmission power of the shared control channel can be controlled using a method applicable to packet switching type communication.

BRIEF DESCRIPTION OF THE DRAWINGS

FIG. 8 is a diagram showing a resource assignment example of an uplink shared data channel;
FIG. 12 is a diagram exemplary showing correspondence relationship between receive quality and transmission power;
FIG. 13 is a diagram showing information items included in a downlink shared control channel;
FIG. 14 is a diagram showing an example of power control according to an embodiment of the present invention.

DESCRIPTION OF REFERENCE SIGNS

Figure 1:
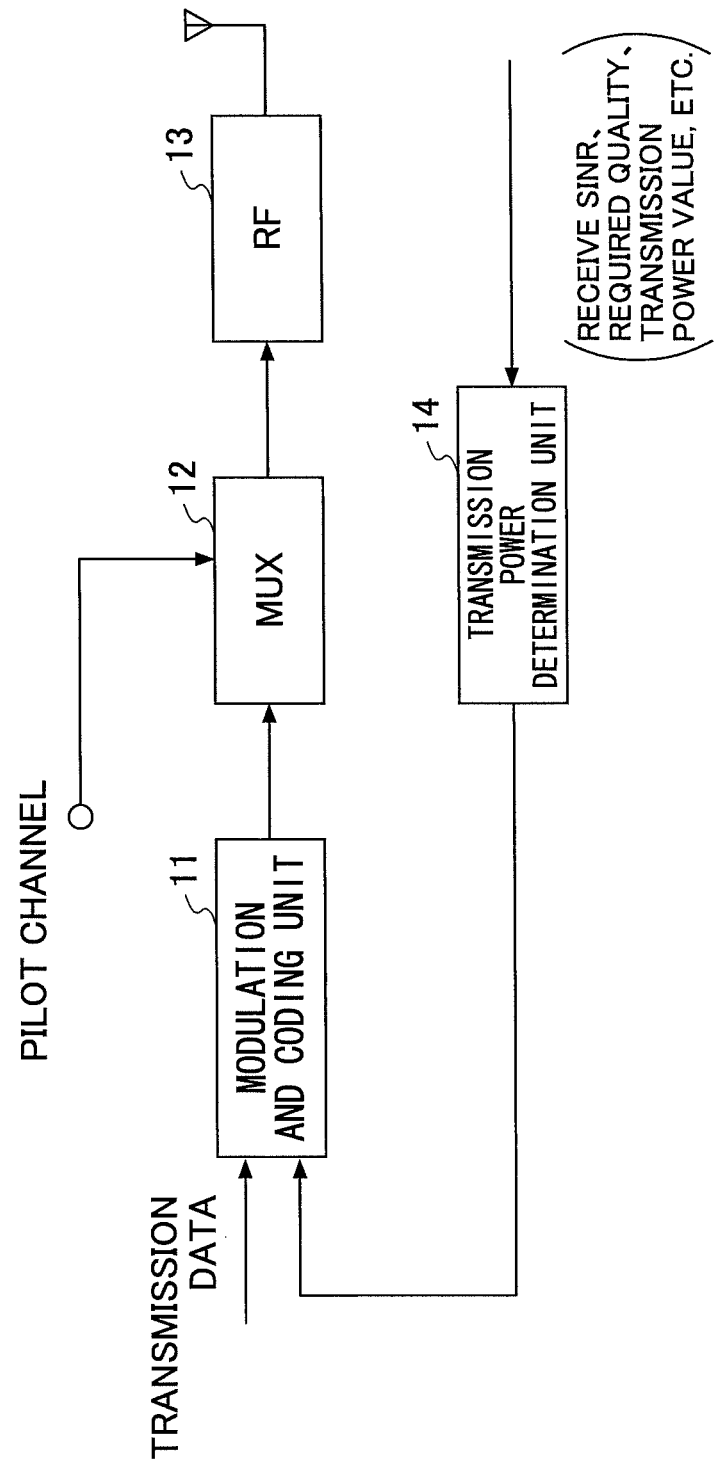
FIG. 1 shows a schematic block diagram of a base station according to an embodiment of the present invention.

11 modulation and coding unit
12 multiplexing unit
13 radio unit 14 transmission power determination unit
21 radio unit
23 demodulation and decoding unit
24 pilot channel processing unit

PREFERRED EMBODIMENTS FOR CARRYING OUT THE INVENTION

According to an embodiment of the present invention, relative or absolute power by which the mobile station needs to change its transmission power is derived based on relationship between receive quality of an uplink pilot channel and receive quality that a control channel needs to satisfy or a transmission power value of the pilot channel. Thus derived power is reported to the mobile station, so that uplink transmission power is properly controlled. Accordingly, without using the transmission power history over a past continuous time, the mobile station receives an instruction on transmission power from the base station each time when sending a packet so as to be able to adjust the transmission power.

When the mobile station has not yet received the instruction, an uplink pilot channel is transmitted after a procedure. In the procedure, a pilot channel and a transmission power is reported to the mobile station using a downlink, and the mobile station derives the transmission power based on an average propagation loss between the mobile station and the base station. The uplink pilot channel is transmitted using the derived power, and it is received by the base station. Accordingly, the base station can properly determine a transmission power of the mobile station of next time based on the pilot channel transmitted from the mobile station.

The propagation loss may be derived from receive quality of a downlink pilot channel and the transmission power value.

According to an embodiment of the present invention, the base station receives both or one of a first pilot channel in which a symbol mapping pattern is constant and a second pilot channel in which a symbol mapping pattern is variable. By preparing a plurality of kinds of uplink pilot channels, both of channel estimation accuracy and transmission efficiency of information can be considered.

According to an embodiment of the present invention, the mobile station that is transmitting traffic data is caused to transmit the control channel using a power derived based on the uplink pilot channel. The mobile station that is not yet transmitting traffic data is caused to transmit the control channel using a power derived based on the average propagation loss. Since the number of mobile stations that are transmitting traffic data is relatively small, efficiency of power control can be improved by applying the CQI based TPC only for the mobile stations.

The base station may further includes means that determines a frequency chunk usable for the mobile station to transmit traffic data and determines a transmission power of the mobile station. The transmission power and the frequency chunk may be determined such that the transmission power exceeds a predetermined threshold and that more chunks are used. Accordingly, resources of the shared data channel can be easily and properly assigned.

A base station according to an embodiment of the present invention includes means that transmits a common pilot channel; means that derives a plurality of transmission powers of a shared control channel based on receive quality of a plurality of common pilot channels reported by an uplink; and means that reports the shared control channel to a plurality of mobile stations using the derived transmission powers.

The derived transmission powers may be separately reported to the mobile stations receiving traffic data. Accordingly, transmission power can be controlled for each mobile station. One of the derived transmission powers may be reported to the mobile stations that are receiving traffic data. Accordingly, the plurality of control stations can be controlled with a same transmission power. The transmission power may be a transmission power corresponding to a mobile station that reports the worst CQI among the plurality of mobile stations.

The shared control channel may be reported to a mobile station that is not receiving traffic data using a predetermined transmission power. Accordingly, transmission power control for the shared control channel can be performed also for mobile stations that desire only transmission of the uplink traffic data.

The base station may include a coder for coding data for one or more mobile station as a unit, and the data for one or more mobile station may be transmitted using a same transmission power. By aligning the unit of coding with the range of data for which same transmission power control is performed, a combination of strength of error correction capability and excess or deficiency of transmission power can be properly set. For example, coding (decoding) can be simplified without excess or deficiency of power, and on the other hand, transmission power can be made large while error correction capability is high.

Embodiment 1

In a downlink, a common pilot channel is announced to all users from a base station, and a mobile station that desires downlink data communication reports receive quality of the common pilot channel to the base station, so that it can be expected that the base station determines a transmission power of the downlink shared control channel. However, in an uplink, the common pilot channel cannot be used. This embodiment is contrived in view of the problem. In the following, a transmission power control method for an uplink shared control channel in the packet switching type mobile communication system is described.

FIG. 1 shows a base station according to an embodiment of the present invention. The base station includes a modulation and coding unit 11 that performs multilevel modulation on data to be transmitted and performs channel coding, a multiplexing unit (MUX) 12 that multiplexes a modulated signal and a pilot channel, and a radio unit (RF) 13 that converts an multiplexed signal to a signal format for transmitting from an antenna, and further includes a transmission power determination unit 14 that determines a transmission power of a mobile station based on information received from an upper apparatus of the base station or from another mobile station or based on base station data.

Figure 2:
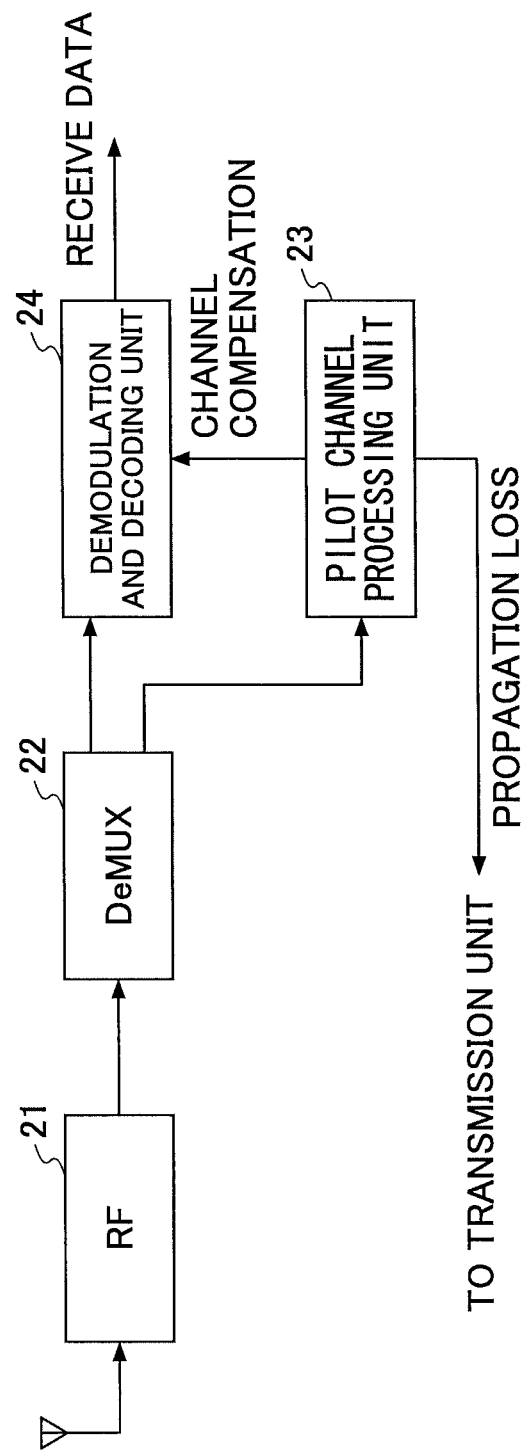
FIG. 2 shows a schematic block diagram of a mobile station according to an embodiment of the present invention.

FIG. 2 shows a mobile station according to an embodiment of the present invention. The mobile station includes a radio unit (RF) 21 that converts a signal format of a signal received by an antenna, a demultiplexing unit (DeMUX) 22 that demultiplexes a pilot channel and other channel from the received signal, a pilot channel processing unit 23 that performs channel estimation using the pilot channel and performs measurement of transmission loss and the like, and a demodulation and decoding unit 24 that demodulates the received data and performs error correction decoding.

Figure 3:
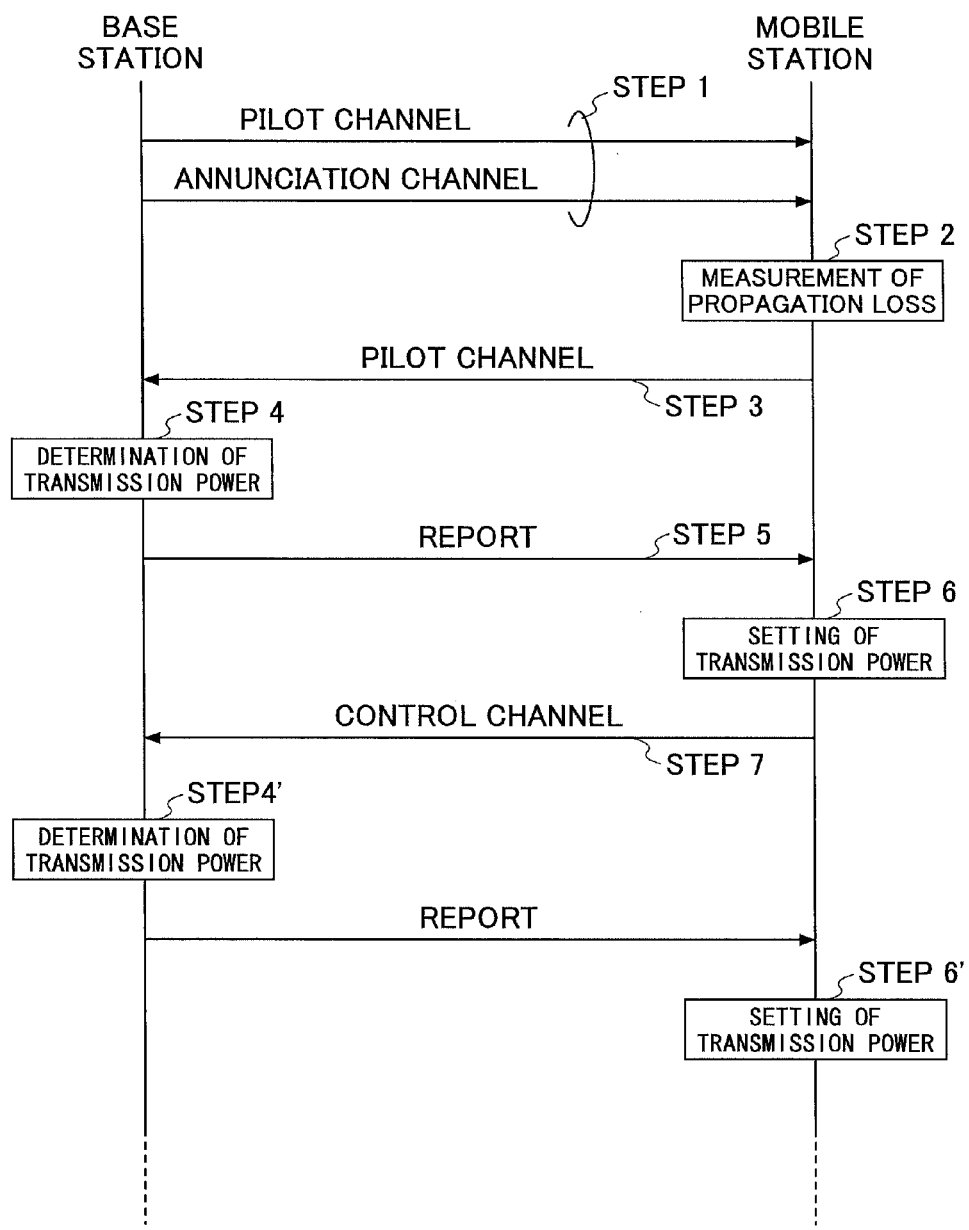
FIG. 3 is a flowchart showing a transmission power control method according to an embodiment of the present invention.

FIG. 3 shows a flowchart showing an uplink transmission power control method according to an embodiment of the present invention. In this embodiment, a shared control channel of a fixed information rate and a shared data channel of a variable rate are prepared as uplink channels. The transmission power control method described below can be used for both of the shared control channel and the shared data channel. Since the transmission rate of the shared control channel is constant, it is essential to control the transmission power of the mobile station for controlling receive quality of the shared control channel. On the other hand, for controlling receive quality of the shared data channel, there a choice of adjusting the transmission rate in addition to controlling the transmission power of the mobile station. The transmission rate can be adjusted by changing the number of levels of the multilevel modulation or changing a coding rate of data. By the way, although the transmission rate of the shared control channel is fixed to be constant in this embodiment for simplifying explanation, the transmission rate of the shared control channel may be changed in another embodiment.

In step 1, a downlink pilot channel is transmitted from the base station to the mobile station, and a transmission power $P_t$ of the pilot channel is also transmitted via an annunciation channel or a broadcast channel (BCH).

Figure 10:
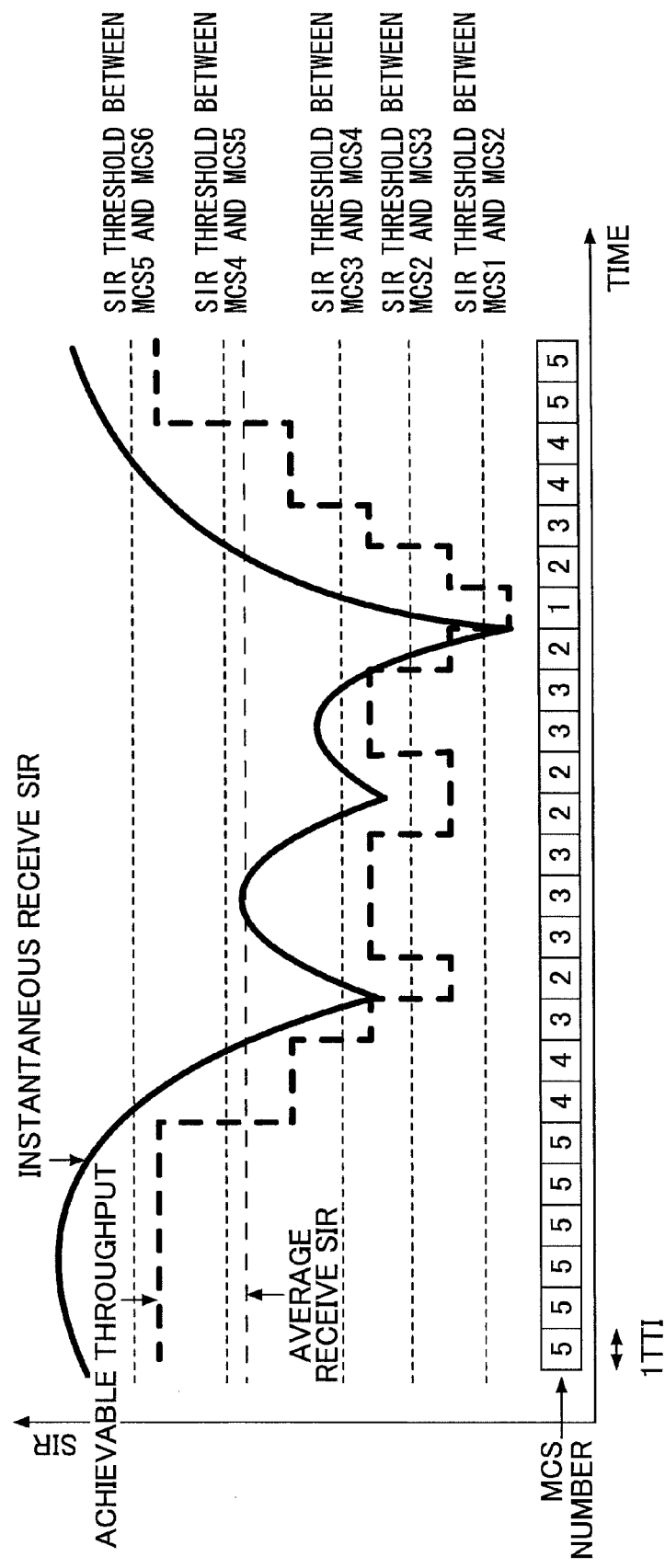
FIG. 10 is a schematic diagram on operation principle of AMC.

As indicated as step 2, the mobile station receives the downlink pilot channel and the transmission power for a period to calculate an average propagation loss L. The propagation loss L is mainly determined by distance variation and shadowing, and in general, the propagation loss L is not largely different between uplink and downlink when being averaged over a proper time. For example, by averaging the receive quality over a relatively long period such as a period of one or more frame, influence of instantaneous variation such as fading is removed. FIG. 10 exemplary shows a relationship between instantaneous receive SIR and an average receive SIR. In this embodiment, although the receive quality is measured as SINR, it may be measured as SIR, or measured as other amount indicating quality. A target quality $SIR_t$ that the base station aims when the base station receives the uplink channel is represented as a following equation.

$$SIR_E = P_{up} + L - I_0 \, [\text{dB}]$$

In this equation, $P_{up}$ indicates a transmission power (the control object at present) transmitted by the mobile station, $I_0$ indicates an interference power for an uplink channel observed at the base station. The propagation loss L is represented as a difference between the transmission power $P_t$ in the base station and the receive power $P_r$ in the mobile station. The annunciation channel announced from the base station includes the transmission power $P_t$ at the base station, the uplink interference power $I_0$ and the target quality $SIR_t$.

In step 3 of FIG. 3, a pilot channel is transmitted from the mobile station to the base station. The transmission power at this time is a power that compensates for propagation loss calculated in step 2, and is not a power that compensates for instantaneous fading received on an uplink propagation route.

Figure 4:
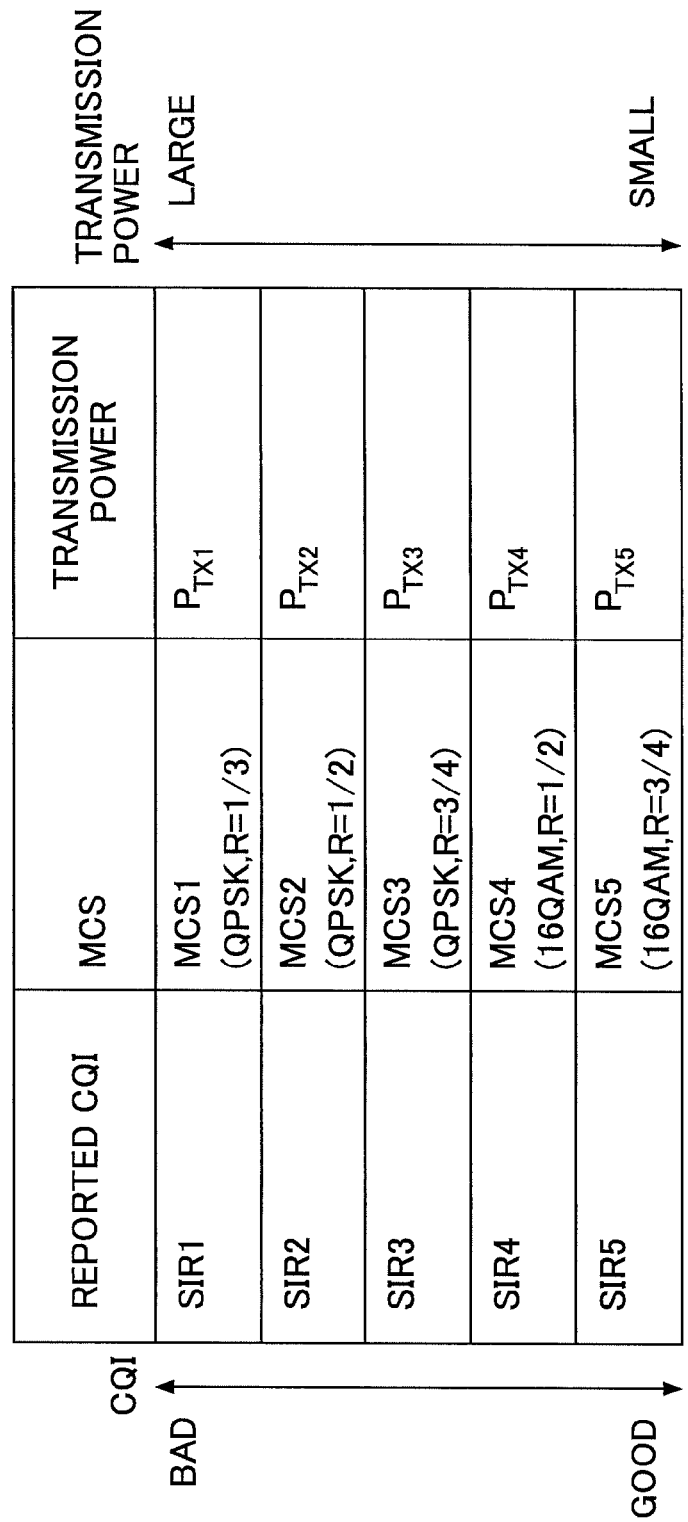
FIG. 4 is a diagram showing an example of correspondence relationship among CQI, MCS number and transmission power.
Figure 5:
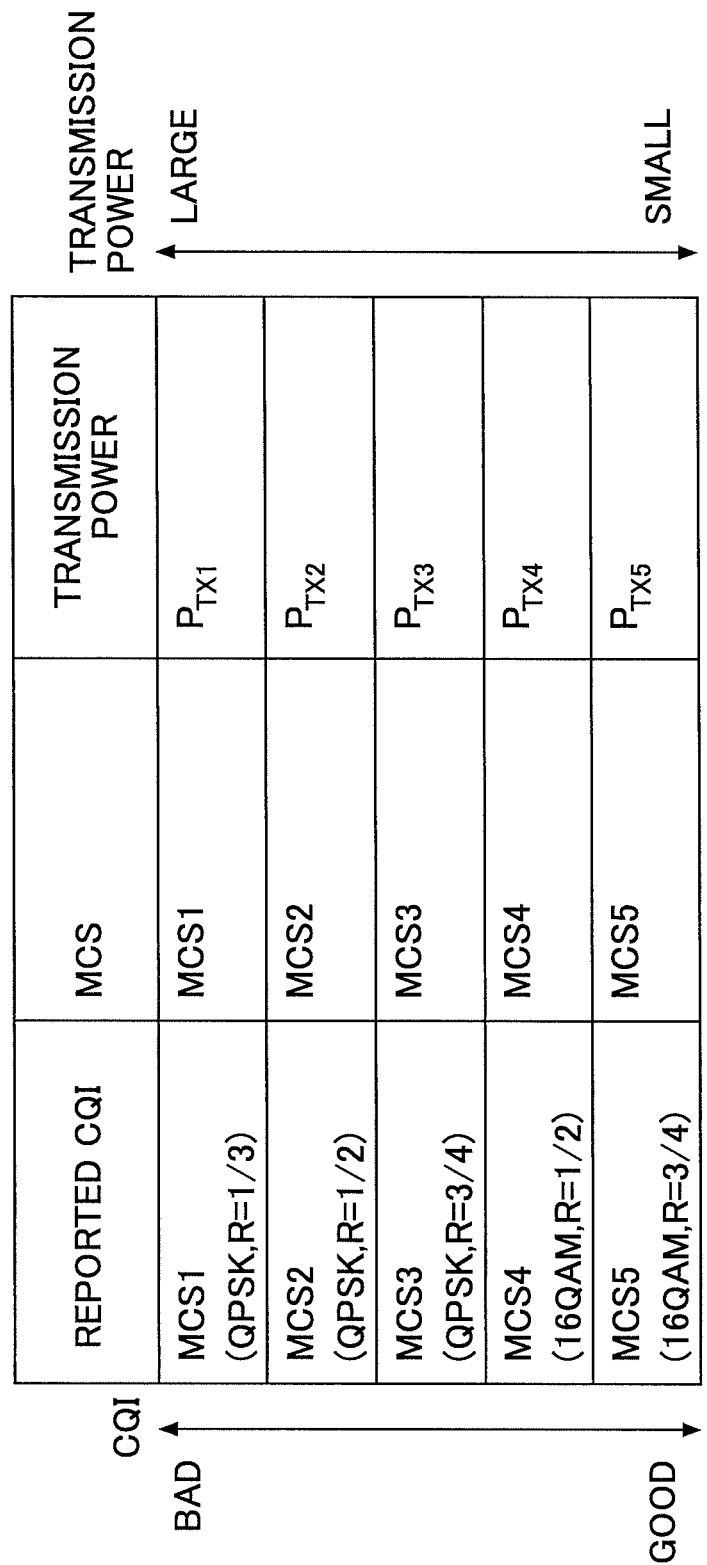
FIG. 5 is a diagram showing an example of correspondence relationship among CQI, MCS number and transmission power.

In step 4, the base station measures a difference between the receive quality (receive SINR) of the received uplink pilot channel and the required quality (required SINR) expected for the pilot channel. The power indicated by the difference (power difference) indicates a power amount (relative power value) by which the mobile station needs to change its transmission power from the current value such that quality of channel received by the base station becomes the required quality. When deriving the power difference, the base station may use a table on receive SIR, required SIR, MCS number and power difference by which power should be changed from the current value. The MCS number specifies a combination of the number of levels of multilevel modulation and a coding rate. FIG. 4 shows a table example defining a correspondence relationship among channel status information (CQI: Channel Quality Indicator) reported from the base station to the mobile station, MCS number and transmission power of the mobile station. The channel status information is measured as SIR typically. In the example of FIG. 4, MCS number and transmission power can be derived based on CQI (SIR) measured by the base station and reported from the base station. FIG. 5 shows a table example that can be used in a case where MCS number, instead of the CQI information, is reported from the base station to the mobile station. FIGS. 4 and 5 show merely examples of a table used for determining the transmission power, and the transmission power may be determined based on other correspondence relationship.

In step 5, the base station reports, to the mobile station, the power difference by which the mobile station needs to change its transmission power from the current value using a downlink control channel.

In step 6, the mobile station adjusts the transmission power based on the instructed information reported by the control channel. The adjusting amount in this case is different from one in control by TPC bit (not up and down by 1 dB), but is an amount for adjusting the current value to a target value at one time.

In step 7, the control channel is transmitted using an adjusted transmission power. This transmission power is a value for compensating for not only the propagation loss but also minute variation such as fading. After that, by repeating the procedure from the step 3 to the step 7 or repeating the procedure of steps 7, 4 and 6 for each packet, an uplink transmission power suitable for the mobile station can be properly kept. However, in the repeated step 3, a pilot channel accompanying the uplink control channel is used.

Embodiment 2

In the second embodiment of the present invention, processes in steps 3, 4 and 5 in FIG. 3 are different. Since processes of other steps are the same, overlapping explanations are not provided.

In step 3, the mobile station transmits a transmission power value of a pilot channel in addition to transmitting the pilot channel to the base station.

In step 4, the base station measures receive quality (receive SINR) of the received pilot channel. The base station compares the receive quality and the required quality, and calculates a power value indicating the difference. A sum of the power value and the transmission power value indicates an absolute value of a power by which the mobile station transmits a channel such that quality of the channel received by the base station becomes the required quality. In the same way as the case of embodiment 1, the power (power difference) indicated as the difference indicates a power amount (relative power amount) by which the mobile station needs to change its transmission power from the current value such that quality of the channel received by the base station becomes the required quality.

In step 5, one or both of the relative power value and the absolute power value is reported from the base station to the mobile station using a downlink.

In step 6, the mobile station adjusts the transmission power according to the instructed information reported by the control channel.

In step 7, the control channel is transmitted using the adjusted transmission power. After that, by repeating the procedure from the step 3 to the step 7 or repeating the procedure of steps 7, 4 and 6 for each packet, the uplink transmission power suitable for the mobile station can be properly kept.

Embodiment 3

The pilot channel of the uplink is an individual pilot channel that is different for each mobile station and that is used for channel estimation, receive quality measurement, synchronization acquisition and the like for the uplink. For the purpose of precisely monitoring communication status that changes every moment, it is better to transmit many pilot channels. However, since the pilot channel is a known signal, the more the transmission amount of the pilot channel is, the more the transmission efficiency becomes lowered. In addition, it is not necessary to perform all of the channel estimation, receive quality measurement, synchronization acquisition for uplink with same frequency.

From this viewpoint, in the third embodiment of the present invention, two types of uplink pilot channels are prepared, in which one is a reference pilot channel that does not necessarily accompany the shared control channel, and another one is a pilot channel for channel estimation that accompanies the shared data channel.

The reference pilot channel may be used for channel estimation, receive quality measurement and synchronization acquisition for uplink, and it is similar to conventional one in terms of purpose of use. However, it is different from conventional one at least in the point that it is transmitted while transmission power control of the embodiments 1 and 2 are being performed such that the receive quality is kept. In addition, it is necessary to estimate the channel so as to compensate for the propagation route for demodulating the shared control channel. For that purpose, the reference pilot channel is transmitted accompanying the shared control channel. On the other hand, for measuring uplink receive quality, the reference pilot channel may be transmitted independently without accompanying the shared control channel. However, the mapping position of the symbol is fixed beforehand as one kind. FIG. 6(A) shows a situation in which the reference pilot channel accompanying the shared control channel and the independent reference pilot channel are transmitted.

Figure 6:
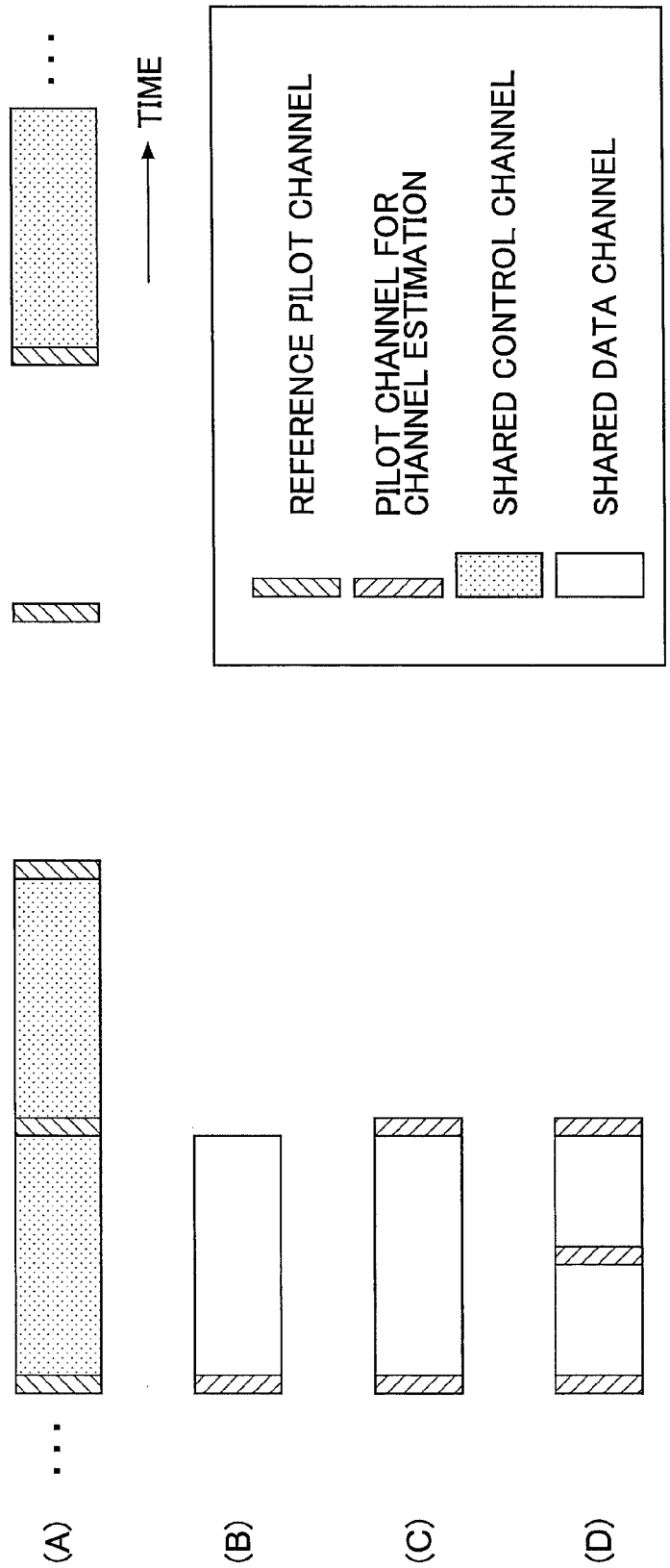
FIG. 6 is a diagram showing mapping examples of a pilot channel.

The pilot channel for channel estimation accompanies the shared data channel and is used for channel estimation. (B)-(D) in FIG. 6 show examples of mapping of the pilot channel for channel estimation. Since the mobile station can move at various high and low speeds, there may be a case in which time variation of channel status is large depending on the mobile station. In this case, as shown in FIGS. 6(C) and (D) instead of FIG. 6(B), many pilot channels for channel estimation are mapped in the time axis direction so that channel estimation accuracy for a user moving at high speed can be improved. For a mobile station that is not moving at high speed, by mapping the pilot channel for channel estimation as few as possible, transmission efficiency for information can be improved. Since the pilot channel for channel estimation is transmitted or not transmitted, it can be referred to as a pilot channel for capturing a reference pilot channel that is always being transmitted. According to the present embodiment, by providing a plurality of types of pilot channels and by adaptively mapping them according to use purpose or communication situation, channel estimation accuracy and information transmission efficiency can be improved.

Embodiment 4

As mentioned above, in the mobile communication system, there are not only a mobile station to which radio resources are actually assigned but also a mobile station that desires assignment but to which radio resources are not yet assigned. Such a situation occurs in both of uplink and downlink circuits. Therefore, the shared control channel includes information on these various statuses.

Figure 7:
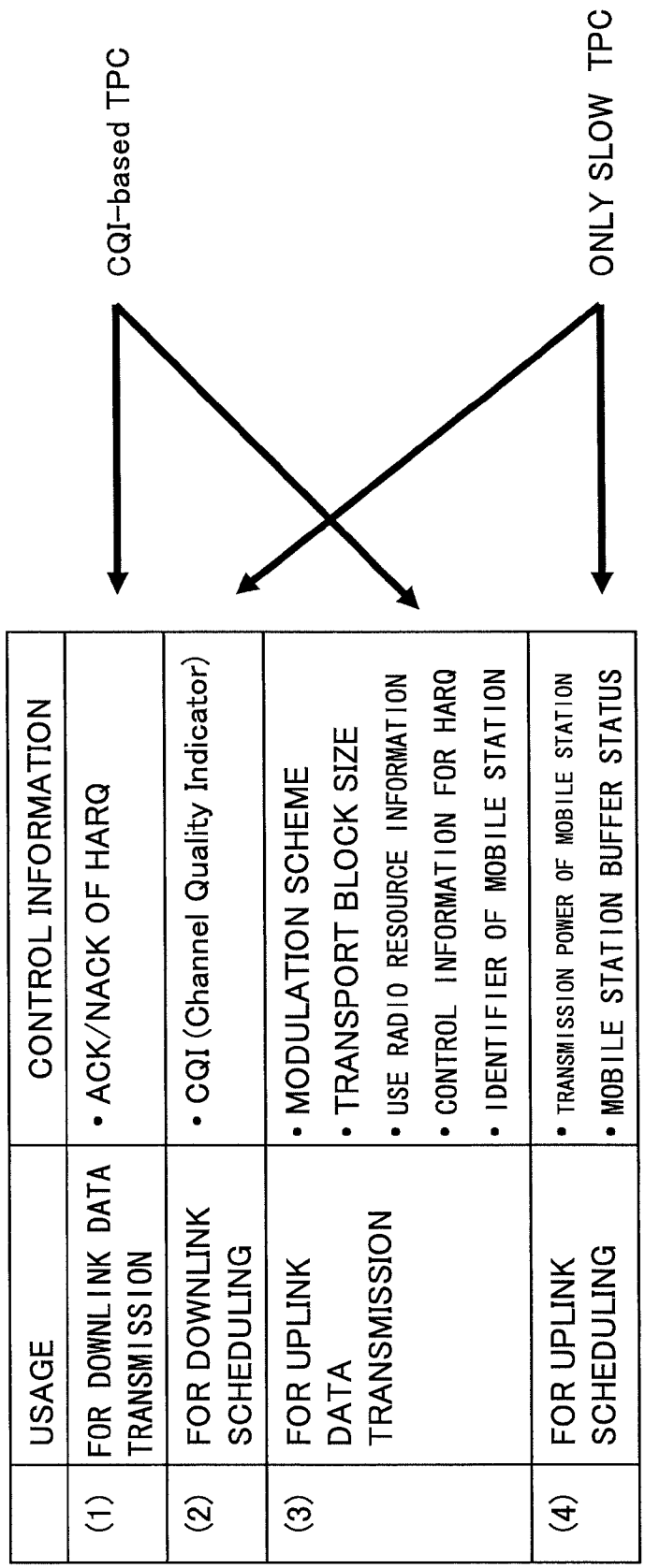
FIG. 7 is a diagram showing information items that are included in an uplink shared control channel.

FIG. 7 shows information items that may be included in an uplink shared control channel. In the control information shown in four lines of (1)-(4), (1) and (2) indicate information on downlink data transmission by the shared data channel, and (3) and (4) indicate information on uplink data transmission by the shared data channel.

The item (1) indicates information of a response transmitted by a mobile station when the mobile station that is actually performing downlink traffic data transmission receives a downlink shared data channel. When the mobile station can properly receive the downlink shared data channel, the mobile station returns an acknowledgement (ACK) to the base station, and when the mobile station cannot properly receive the downlink shared data channel, the mobile station returns a negative acknowledgement (NACK) to the base station.

The item (2) indicates CQI information reported, to the base station, by the mobile station that is not currently performing downlink traffic data transmission but wants to perform data transmission in the future. The mobile station that desires to perform the uplink data transmission measures receive quality of a pilot channel included in the annunciation channel, and reports the measurement result as the CQI information to the base station to request scheduling of next time.

The item (3) indicates information accompanying the uplink shared data channel transmitted by the mobile station that is actually performing uplink traffic data transmission. This accompanying information is used for demodulation of shared data channel in the base station, for example. More particularly, the accompanying information may include modulation scheme, transport block size, retransmission control information, and identifier of the mobile station and the like. The modulation scheme is information for specifying a scheme such as QPSK, 16 QAM and the like, and it may be represented as a number of levels of multilevel modulation. The retransmission control information may include, for example, a process number for specifying a position of a packet in hybrid ARQ (HARQ), a redundancy format of a retransmitted bit, a new data indicator indicating whether a packet is new data or a retransmitted packet, or the like.

The item (4) indicates information reported to the base station by a mobile station that is currently not performing traffic data transmission but desires to perform data transmission in the future. This information may include information on a transmission power or a buffer status of the mobile station. For example, transmission power information may include information indicating how large a power is by which the mobile station transmits the shared control channel, information (maximum transmission power) indicating how large the power is at the maximum by which the mobile station can transmit it, or the like. The buffer status may be represented as a data amount (a filling factor of a buffer) stored in a transmission buffer of the mobile station. For example, the larger the data amount is, the larger the priority of the scheduling may be set.

In the present embodiment, the base satiation determines which of the items (1)-(4) corresponds to transmission contents of the shared control channel. As a result, as to a mobile station ((1), (3)) that is actually performing traffic data transmission, the transmission power of the uplink shared control channel is controlled by the method described in the embodiment 1 or 2. That is, the base station measures receive quality of a pilot channel received from the mobile station, and determines and reports the transmission power of the mobile station according to the quality, so that the mobile station transmits the uplink shared control channel according to the reported information (this transmission power control method is to be referred to as "CQI based TPC" for the sake of convenience).

On the other hand, as to a mobile station ((2), (4)) that is not currently performing uplink traffic data transmission but desires to perform the data transmission in the future, the transmission power of the uplink shared control channel is controlled by the method described in steps 2 and 3 in FIG. 3. That is, the mobile station receives the pilot channel and the annunciation channel for a period so as to calculate an average propagation loss, so that the uplink shared control channel is transmitted to compensate for the propagation loss and compensate for interference power at the base station (this transmission power control method is to be referred to as "slow TPC" for the sake of convenience).

Since the transmission power is adaptively changed at every moment in the CQI based TPC, calculation load for determining it is large. Therefore, if control of the transmission power of the uplink shared control channel is performed based on the CQI based TPC for all of the mobile stations, there is a fear that calculation load and delay in the base station become very large. On the other hand, as to the uplink shared control channel for the mobile station, corresponding to (2) and (4), that is not yet performing traffic data transmission, the importance is lower than that corresponding to (1) and (3). For example, when the acknowledgement (ACK) of retransmission control is erroneously determined, useless traffic increases to exert a bad influence on the system. But, even though the buffer status of the mobile station is erroneously determined, large bad effect does not arise. In addition, there is a possibility that the number of mobile stations related to (2) and (4) becomes far larger than that of mobile stations related to (1) and (3). From this viewpoint, in the present embodiment, the CQI based TPC is performed for the mobile stations related to (1) and (3), so that accurate transmission power control that can address instantaneous fading variation is performed. Then, slow TPC is performed for the mobile stations related to (2) and (4) in which instantaneous fading is not compensated for, and slow transmission power control is performed such that signal quality is maintained averagely. Accordingly, the CQI based TPC described in embodiments 1 and 2 can be efficiently used.

Embodiment 5

FIG. 8 indicates a radio resource assignment example for an uplink shared data channel according to a fifth embodiment of the present invention. Each procedure shown in FIG. 8 is executed in the base station. In the present embodiment, there is a mobile station that is actually transmitting traffic data using an uplink shared data channel. This mobile station transmits the uplink shared control channel or the pilot channel or the like including the information item of (3) shown in FIG. 7 in the embodiment 4. The base station receives the pilot channel transmitted from the mobile station, and the flow of FIG. 8 goes to step 10.

In step 10, receive quality of the pilot channel is measured as CQI information.

In step 12, a band of the uplink shared data channel for the mobile station is determined based on the measured CQI information and the transmission power information received from the mobile station. In the present embodiment, the usable band is divided into a plurality of frequency blocks each including one or more sub-carrier. Typically, the present invention is used for a radio communication system of an orthogonal frequency division multiplexing (OFDM) scheme. The frequency block is also referred to as a frequency chunk or simply a chunk. One or more frequency chunk may be used as various references such as a unit of resource assignment, a unit of retransmission, or a unit of coding. In the present embodiment, one frequency chunk is set as a unit of resource assignment.

Figure 9A:
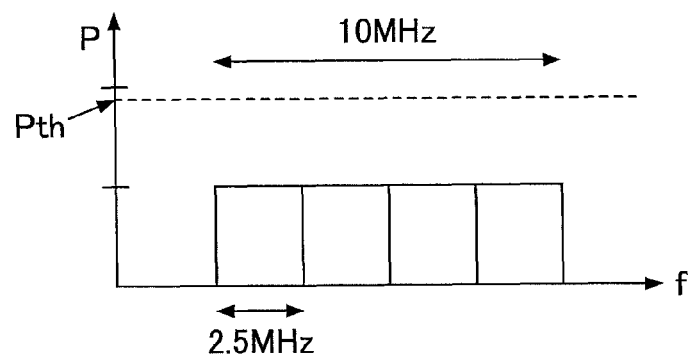
FIGS. 9A-9D show a plurality of candidates considered when assigning a band.
Figure 9B:
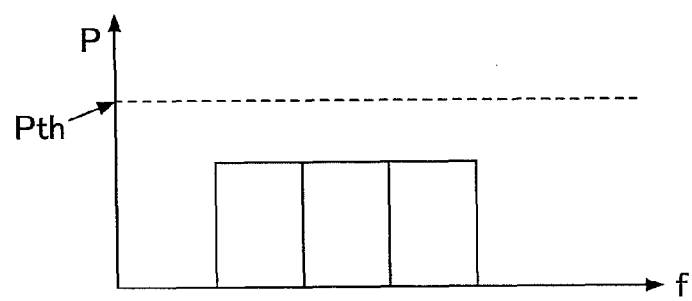
Figure 9C:
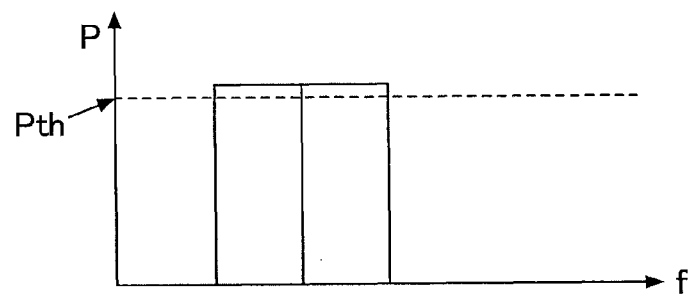
Figure 9D:
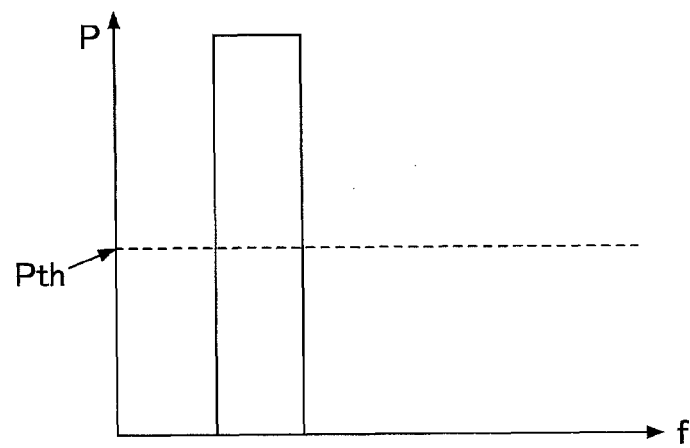

FIGS. 9A-9D show a plurality of candidates considered when assigning a band. The lateral axis of each figure corresponds to frequency f, and the vertical axis corresponds to power P. As shown in FIG. 9A, a band of 10 MHz is divided to four frequency chunks of 2.5 MHz. In step 12 of FIG. 8, resources are determined such that the power becomes greater than a power threshold $P_{th}$ derived from the transmission power information of the mobile station and that a band as wide as possible is kept (the band is determined such that the transmission power per one chunk is equal to or greater than the threshold and that the band occupies a wider transmission bandwidth.) For example, as to transmission power of the mobile station reported from the mobile station, assuming that relationship between the power threshold $P_{th}$ and the frequency chunk becomes each of ones in FIG. 9. In this case, in the resource assignments shown in FIGS. 9A and 9B, since the power is less than the threshold, these two candidates are excluded. Although each of FIGS. 9C and 9D exceeds the threshold of the power, since the one shown in FIG. 9C occupies a wider frequency band, it is determined to be an optimal resource assignment method.

In step 14 of FIG. 8, a MCS number corresponding to the power determined in step 12 is selected.

In step 16, information on the MCS number derived in step 14, the band (information for specifying frequency chunk) determined in step 12 and transmission power and the like is reported to the mobile station via the downlink shared control channel. Accordingly, the mobile station can properly transmit the uplink shared data channel. According to the present embodiment, as shown in FIG. 10, an adaptive modulation and coding (AMC) scheme is adopted for addressing instantaneous fading, and the MCS number is adaptively updated for each TTI in the example shown in the figure. By adopting AMC in addition to the slow TPC for bringing the average receive SIR close to a target value, transmission quality of the uplink shared data channel can be improved.

Embodiment 6

Figure 11:
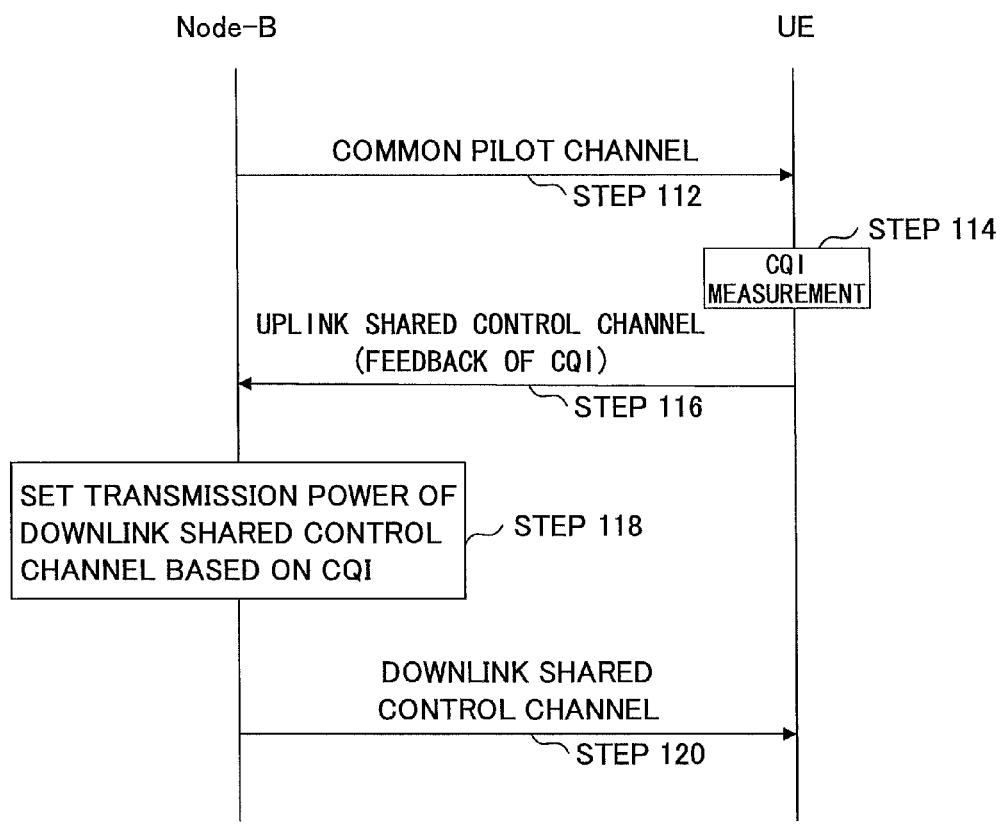
FIG. 11 is a flowchart showing a transmission power control method according to an embodiment of the present invention.

Uplink transmission power control is described in the first to fifth embodiments, and a transmission power control method for a downlink shared control channel is described in the sixth embodiment of the present invention. FIG. 11 is a flowchart showing a transmission power control method according to an embodiment of the present invention. As shown in step 112, the base station transmits a common pilot channel to mobile stations under the base station. The common pilot channel is different from the pilot channel that is transmitted by each mobile station via an uplink in that the common pilot channel is commonly transmitted to all of the mobile stations. In step 114, the mobile station measures receive signal quality as CQI information based on the received common pilot channel. The mobile station performing downlink data transmission reports the measured CQI information to the base station using the uplink shared control channel in step 116. In step 118, the base station determines a transmission power of the downlink shared control channel based on the reported CQI information. Correspondence relationship between CQI information and transmission power shown in FIG. 12 is prepared beforehand. In step 120, the base station transmits the downlink shared control channel using the determined power in step 118. Accordingly, the transmission power of the downlink shared control channel can be determined based on the CQI information measured in the mobile station (this method is to be referred to as "CQI based downlink TPC" for the sake of convenience).

FIG. 13 indicates information items that may be included in the downlink shared control channel. These information items are largely classified as control information on downlink (left column) and control information on uplink (right column). In addition, as shown in the left side of the figure, the control information is largely classified as one on physical layer (upper side) and one on layer 2 (L2) (lower side). The control information on the downlink may include demodulation information, scheduling information and retransmission control information (HARQ). The demodulation information may include chunk assignment information, data modulation information and transport block size information. The chunk assignment information is information for specifying a frequency chunk to be assigned to the downlink shared data channel to the mobile station. The data modulation information is information for specifying a modulation scheme applied to the shared data channel, and it may be specified by the MCS number. The transport block size information indicates the number of bits that are transmitted, and can be associated with coding rate, and may be specified by the MCS number. The scheduling information may include identification information for identifying the mobile station. The retransmission control information may include a process number of a transmitted packet, information indicating redundancy format, and a new data indicator. The new data indicator is an indicator that indicates whether a packet is a new packet or a retransmitted packet.

The control information on the uplink may include a transmission power control bit, a transmission timing control bit, a response bit of a contention-based channel, scheduling information and retransmission control information (HARQ) and the like. The transmission power control bit and the transmission timing control bit indicate a transmission power and a transmission timing when transmitting the uplink shared data channel, and these are determined and reported in scheduling by the base station. The contention-based channel is a channel that may be transmitted from the mobile station to the base station without scheduling, and that is a channel that may cause contention between the mobile station and another mobile station. The contention-based channel may be a fast access channel and the like that includes a reservation packet for requesting scheduling of the shared data channel, traffic data of small size or control data. The control information includes response information (ACK/NACK), as response contents, indicating whether the contention-based channel that is transmitted from the mobile station is properly received by the base station. The scheduling information may include identification information of the mobile station, chunk assignment information, data modulation information and transport block size and the like. These are similar to those described for the downlink, but these are different in that these are information on the uplink. The retransmission control information (HARQ) includes information (ACK/NACK) indicating whether information transmitted from the mobile station to the base station is properly received by the base station.

The mobile station that receives the control information on the downlink (left side) actually receives traffic data using the downlink shared data channel. Therefore, since the number of that kind of mobile stations is the maximum number of users that can be assigned at most, the number of the mobile stations is not enormous. Therefore, the power of the downlink shared control channel may be controlled using the CQI based downlink TPC for each mobile station. Alternatively, "CQI based downlink TPC" for a mobile station corresponding to the worst CQI among a plurality of mobile stations may be applied to other mobile stations. On the other hand, mobile stations that receive control information on uplink (right side) include mobile stations that desire to transmit traffic data using the uplink shared data channel currently or in the future. In the mobile stations, as to mobile stations that receives control information on the downlink, power control using the CQI based downlink TPC may be performed for each mobile station like the case of downlink, or "CQI based TPC" for a mobile station corresponding to bad CQI may be similarly applied to other mobile stations. However, there may be many mobile stations (including mobile stations desiring only uplink data transmission) that do not receive downlink traffic data currently or in the future. In addition, since it is not necessary that such mobile stations report receive quality of a received pilot channel to the base station as CQI information, it is difficult to perform CQI based downlink TPC. In the present embodiment, as to such mobile station, the shared control channel is transmitted using a power that is fixed to be a constant value.

FIG. 14 shows an example of power control according to the present embodiment. In this example, users #1-#3 among five users are receiving downlink traffic data. Therefore, the downlink shared control channel for the user #1 may be controlled by the CQI based downlink TPC, and the transmission power is indicated as $P_1$. For the users #2 and #3, in the same way, they may be controlled by the CQI based downlink TPC separately, and the transmission powers are represented as $P_2$ and $P_3$ respectively. Alternatively, transmission power control for a mobile station that reports the worst CQI among the three users may be applied to other mobile stations. The transmission power $P_\alpha$ ($\alpha=1$, 2 or 3) in this case is made common to the users #1-#3. In addition, in the example shown in the figure, the remaining users #4 and #5 in the five users do not receive downlink traffic data, so that the downlink shared control channel for these mobile stations is transmitted using a fixed power $P_{FIX}$.

By the way, data transmitted from a transmitter is coded, modulated, mapped to radio resources, converted to a transmission symbol (OFDM symbol, for example), and transmitted. Coding is performed for providing error correction capability. Convolution coding or turbo coding or the like may be performed. The unit for performing coding may be a chunk, or data of a plurality of chunks may be coded as a whole. As for the present embodiment, it is desirable that coding is performed in units of data for which same transmission power control is performed. For example, when the transmission power control is performed for each user, it is desirable that coding is also performed for each user. When transmission power control is performed for three users as a whole, it is desirable that coding is performed for three users as a whole.

Figure 15:
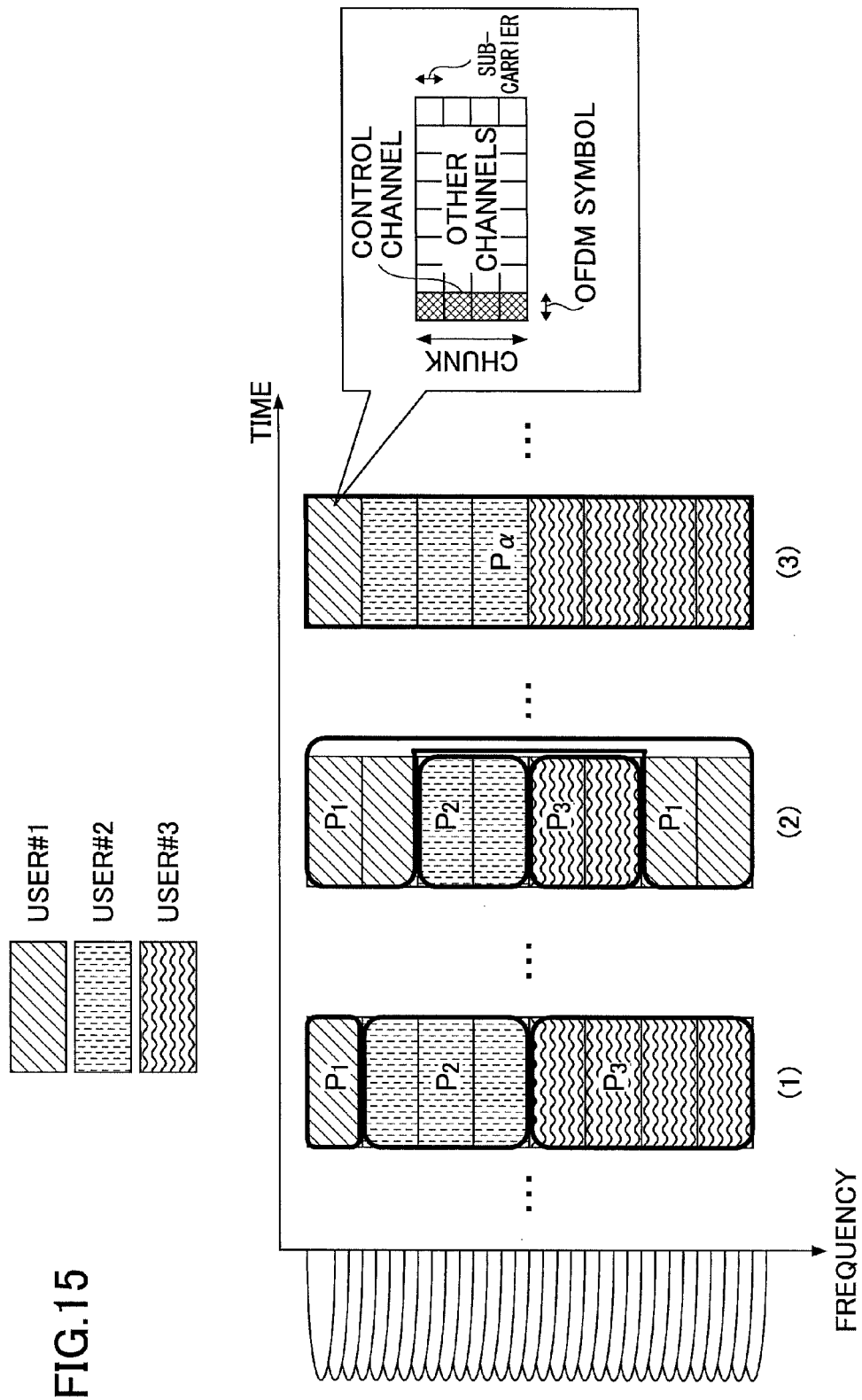
FIG. 15 is a diagram showing radio resources and a unit of coding.

For example, in a situation described with reference to FIG. 14, assuming that resources of three users of users #1, #2 and #3 are assigned as shown in FIG. 15(1). One chunk is assigned to the user #1, three chunks are assigned to the user #2, and four chunks are assigned to the user #3. Coding is performed for each user, and each of three ranges of data each enclosed with a thick line is coded separately. As to these pieces of data, three users are controlled by "CQI based downlink TPC" separately, and transmission powers are represented as $P_1$, $P_2$ and $P_3$ respectively. FIG. 15(2) also shows a situation in which coding and power control are performed for each user, but assignment of chunk is different. In the example shown in FIG. 15(3), data of three users are coded as a whole, and a control method (CQI based downlink TPC) for one of the users is applied to other users. The transmission power is indicated as $P_\alpha$ ($\alpha$=1, 2 or 3), and is transmission power for a user that reports the worst CQI. By the way, the user number and the unit for bringing together in coding are merely examples, and various numbers may be adopted. Generally, the larger the unit for coding is, the higher error correction ability becomes, but calculation load tends to increase. Therefore, in the example shown in FIG. 15(1), calculation load for coding and decoding is small, and transmission power is optimally controlled without excess or deficiency. On the other hand, in the example shown in FIG. 15(3), although calculation load for coding and decoding becomes large, large error correction ability can be expected, and in addition, since power becomes excessive for two users of the three users, improvement of data can be expected. From the viewpoint for simplifying processes and strengthening improvement of quality, it is desirable to adopt same power control to data included in one unit of coding like the present embodiment.

The present application claims priority based on Japanese patent application No. 2005-174395, filed in the JPO on Jun. 14, 2005 and Japanese patent application No. 2005-241902, filed in the JPO on Aug. 23, 2005, and the entire contents of them are incorporated herein by reference.

The invention claimed is:

1. A base station comprising:
a unit configured to derive a transmission power of a mobile station based on receive quality of a known signal of an uplink;
a unit configured to report the derived transmission power to the mobile station; and
a unit configured to receive a control channel transmitted by the mobile station according to the reported information,
wherein the base station reports a known signal and a transmission power using a downlink, and
receives the known signal of the uplink that is transmitted with a power derived by the mobile station based on an average propagation loss between the mobile station and the base station, and
the base station causes the mobile station that is transmitting traffic data of the uplink to transmit a control channel of the uplink that includes at least one of ACK/NACK and CQI using a power derived based on a past known signal of the uplink.

2. The base station as claimed in claim 1, wherein the base station causes the mobile station that is not transmitting traffic data of the uplink to transmit the control channel of the uplink using a power derived based on the average propagation loss.

3. The base station as claimed in claim 1, wherein the base station derives a relative power amount by which the mobile station needs to change a transmission power based on relationship between the receive quality of the known signal of the uplink and receive quality that the control channel needs to satisfy.

4. The base station as claimed in claim 1, wherein the base station derives an absolute power amount to which the mobile station needs to change a transmission power based on relationship between the receive quality of the known signal of the uplink and a transmission power value of the known signal.

5. The base station as claimed in claim 1, wherein the propagation loss is derived from the receive quality and the transmission power value of the known signal of the downlink.

6. The base station as claimed in claim 1, wherein the base station receives both or one of a first known signal in which a symbol mapping' pattern is constant and a second known signal in which a symbol mapping pattern is variable.

7. The base station as claimed in claim 1, the base station further comprising:
a unit configured to determine a frequency chunk usable for the mobile station to transmit traffic data and determine a transmission power of the mobile station.

8. The base station as claimed in claim 7, wherein the transmission power and the frequency chunk are determined such that the transmission power exceeds a predetermined threshold and that more chunks are used.

9. A mobile station comprising:
a unit configured to receive a transmission power using a downlink when a base station derives the transmission power by which the mobile station needs to change based on receive quality of a known signal of an uplink; and
a unit configured to change its transmission power based on reported information to transmit a control channel,
wherein the mobile station receives a known signal and transmission power value using a downlink, and
derives a transmission power based on an average propagation loss between the mobile station and the base station, and transmits the known signal of the uplink using the derived transmission power, and
when the mobile station is transmitting traffic data of the uplink, the mobile station transmits a control channel of the uplink that includes at least one of ACK/NACK and CQI using a transmission power derived by the base station based on a past known signal of the uplink.

10. The mobile station as claimed in claim 9, wherein, when the mobile station is not transmitting traffic data of the uplink, the mobile station transmits the control channel of the uplink using a power derived based on the average propagation loss.

11. The mobile station as claimed in claim 9, wherein the mobile station transmits both or one of a first known signal in which a symbol mapping pattern is constant and a second known signal in which a symbol mapping pattern is variable.

12. A power control method comprising the steps of:
deriving a transmission power of a mobile station based on receive quality of a known signal of an uplink;
reporting the derived transmission power to the mobile station; and
receiving a control channel transmitted by the mobile station according to the reported information,
wherein a base station reports a known signal and a transmission power using a downlink, and
receives the known signal of the uplink that is transmitted with a power derived by the mobile station based on an average propagation loss between the mobile station and the base station, and
the base station causes the mobile station that is transmitting traffic data of the uplink to transmit a control channel of the uplink that includes at least one of ACK/NACK and CQI using a power derived based on a past known signal of the uplink.

13. The power control method as claimed in claim 12, wherein the base station causes the mobile station that is not transmitting traffic data of the uplink to transmit the control channel of the uplink using a power derived based on the average propagation loss.

14. A power control method comprising the steps of:
receiving a transmission power using a downlink when a base station derives the transmission power by which a mobile station needs to change based on receive quality of a known signal of an uplink; and changing its transmission power based on reported information to transmit a control channel, wherein the mobile station receives a known signal and a transmission power value using a downlink, and derives a transmission power based on an average propagation loss between the mobile station and the base station, and transmits the known signal of the uplink using the derived transmission power, and when the mobile station is transmitting traffic data of the uplink, the mobile station transmits a control channel of the uplink that includes at least one of ACK/NACK and CQI using a transmission power derived by the base station based on a past known signal of the uplink.

15. The power control method as claimed in claim 14, wherein, when the mobile station is not transmitting traffic data of the uplink, the mobile station transmits the control channel of the uplink using a power derived based on the average propagation loss.

* * * * *